Dec. 16, 1969  D. J. ROWAN  3,484,015

INSULATING FOOD CONTAINER

Filed June 21, 1968

INVENTOR.
DARREL J. ROWAN
BY
*Oldham & Oldham*
ATTORNEYS

United States Patent Office 3,484,015
Patented Dec. 16, 1969

3,484,015
INSULATING FOOD CONTAINER
Darrel J. Rowan, 30 Lindsey Road, Apt. C,
Munroe Falls, Ohio 44262
Filed June 21, 1968, Ser. No. 739,071
Int. Cl. B65d 11/00, 41/16; A45c 11/20
U.S. Cl. 220—4                                        1 Claim

ABSTRACT OF THE DISCLOSURE

A heat insulating, food storage and transport device comprising a relatively wide, shallow base and a similar relatively wide, shallow top where both the base and the top are made from a light plastic material is shown. These base and top members have interlocking edge portions formed thereon.

This invention relates to heat insulating, food storage and transportation devices, and particularly to relatively wide, shallow, lightweight and inexpensive articles for receiving, storing and transporting hot food articles, such as pizzas.

It is well known that many people buy hot food articles at a store and then take such hot food articles or dishes home for consumption. Unfortunately, in many instances, these dishes, while usually very well prepared and tasty when hot, may lose their appetizing properties and cool appreciably while being transported to a home for consumption.

It is the general object of the present invention to provide a novel and improved heat insulating, food storage and transportation device, and particularly a wide, shallow unit for receiving articles such as pizzas therein.

Another object of the invention is to make a food storage and insulating device or article from lightweight, inexpensive materials, such as pressed polystyrene beads and wherein the unit is provided with interlocking edge portions thereon where a hot food article placed therein can be maintained at or substantially at a given temperature for some appreciable storage time, such as one hour.

Another object of the invention is to provide a lightweight, but sturdy plastic heat insulating article for food products and wherein the top and bottom portions of the article are provided with interlocking edge portions to effectively seal around the article being transported, and where the device is made from plastic materials having at least slight resiliency.

The foregoing and other objects and advantages of the invention will be made more apparent as the specification proceeds.

Reference now is made to the accompanying drawings, wherein.

When referring to corresponding members shown in the drawings and referred to in the specification, corresponding numerals are used to facilitate comparison therebetween.

Figure 1:
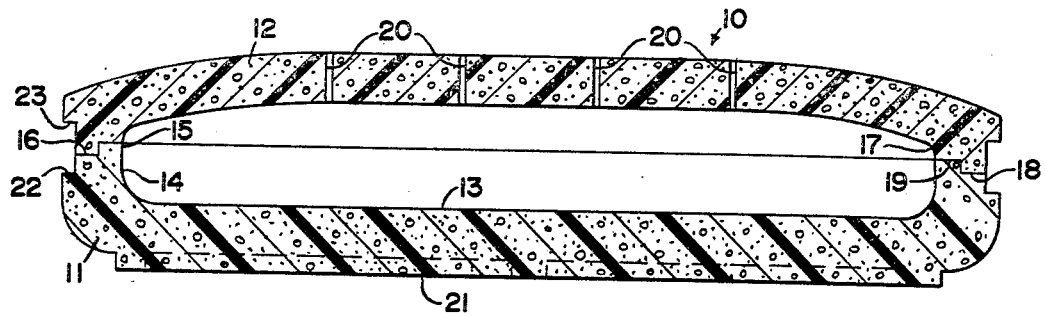
FIG. 1 is a vertical cross section through a heat insulating food storage and transport device embodying the principles of the invention.
Figure 2:
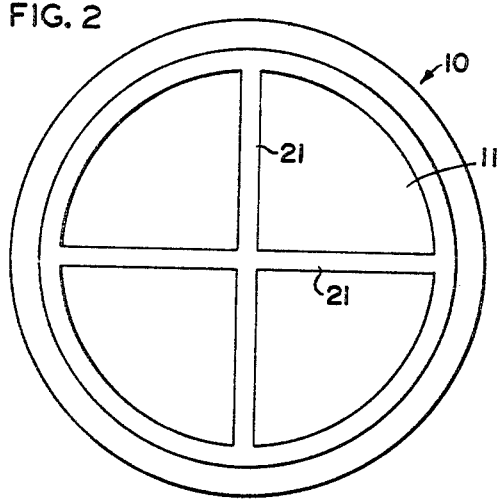
FIG. 2 is a reduced size bottom plan of the device of FIG. 1.

Reference now is made to the details of the structure shown in the drawings, and a heat insulating, food storage and transportation device is indicated as a whole by the numeral 10. This device or container 10 includes a relatively wide, shallow base 11 and a relatively wide, shallow top 12. The base or bottom 11 is shown to be provided with a flat inner surface 13 and an upstanding edge rib or flange 14 that terminates in an upper edge portion 15 that, in effect, has a stepped or rabbetted reduced height shoulder 16 formed thereon. Likewise, the top 12 has a substantially flat inner surface and it has a downwardly extending edge or rib 17 formed thereon that terminates in a lower edge portion 18 that likewise is of a rabbetted shape and has a recessed radially inner shoulder 19 formed thereon. These upper and lower edge portions 15 and 18, respectively, are adapted for interlocking telescopic engagement so as to form a seal for the device 10. FIG. 1 of the drawings shows that the edge portions 15 and 18 are of reduced radial width in relation to the base portions of the ribs 14 and 17, respectively, which base portions strengthen the ribs and the reduced width of the edge portions 15 and 18 facilitates interlocking engagement thereof.

The drawings also clearly show that preferably a number of vents 20 are formed in the top 12 to permit steam or other vapors to escape from an article received within the device 10, whereas the base 11 is strengthened by the provision of a plurality of radially extending reenforcing ribs 21 formed thereon.

The device 10 of the invention preferably is made solely from a lightweight, relatively inexpensive plastic material. Thus, preferably the base 11 and top 12 are both formed solely from a relatively sturdy plastic material, such as pressed polystyrene beads that form a relatively porous lightweight, but sturdy article that has some resilience. Hence, the entire structure can be molded to a desired shape and by pressures applied to the polystyrene beads during the molding operation, it can be formed to any desired density. Also, any equivalent plastic materials such as polyurethane or ordinary polystyrene resins or plastics can be used in making the articles of the invention.

While the drawings show that a relatively wide, shallow article is provided, preferably this device 10 is used for storing hot articles, such as pizzas therein, and to this end, the device 10 preferably is made approximately 14½ inches in outer diameter, whereas preferably the overall height of the device 10 is approximately 2½ inches so that the device 10 preferably is formed of an outside diameter that is about 6 and usually between 5 and 7 times its height in diameter.

Figure 3:
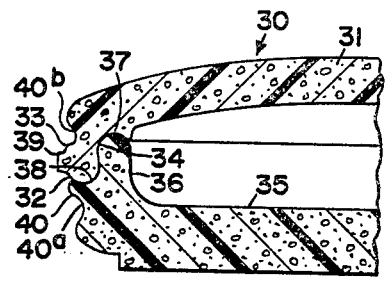
FIG. 3 is a fragmentary vertical section through a modification of the article of the invention.

In some instances, it is desirable to provide more of a positive interlock between the adjacent edge portions 15 and 18 from the structure shown in FIG. 1. Thus, a device or container 30 is shown in FIG. 3, and in this instance, a top 31 has a downwardly extending edge or rib 33 thereon that includes an enlarged edge bead 32 of arcuate shape in section and which arcuate contour extends more than 180° to form recess or thinner portion on the base portion of the rib. A concave bead seat 34 is provided at a radially inner portion positioned vertically upwardly from the edge bead 33. The bottom or base 35 of the container 30 likewise has a vertically upwardly extending rib 36 thereon and a radially inner edge bead 37, complementary in shape to the edge bead 22 and specifically to the bead seat 34 is provided on this rib 36 and a radially outer concave bead seat 38 is also formed on the rib whereby the edge bead 32 of the top and the edge bead 37 on the bottom or base can be sprung into engagement with each other for tight engagement with the associated bead seats and a positive interlock is obtained. These ribs 33 and 36 can be reenforced, if desired, by radially outwardly extending edge flanges 39 and 40 formed thereon whereby a reusable container is provided and this container likewise is formed from the same materials as is the device 10 and the container will serve effectively to retain the heat in any article received in the enclosure provided by the container 30.

Figure 4:
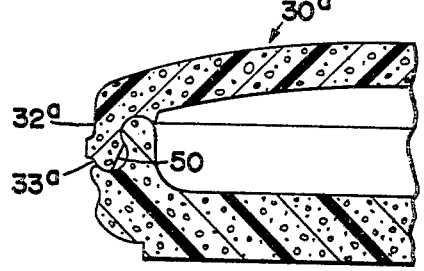
FIG. 4 is a fragmentary vertical section of a further modification of the device of the invention.

The structure shown in FIG. 4 provides a container 30a which is very similar in design and construction to the container 30 only in this instance, the edge bead 33a provided on the top of the container has a flat portion 50 formed on the radially inner surface thereof and extending at an acute angle to the vertical. Such flat portion 50 thus facilitates springing the top and the rib 32a thereof over the upstanding rib provided on the base of the container and facilitates the engaging and disengaging action between these associated edge beads and bead seats, but yet still requires some resiliency in the respective top and base of the container 30a.

Edge ribs 22 and 23 are formed on the base or bottom 11 and top 12 to aid in opening the container.

Naturally, interlocking ribs or edge beads and bead seats as shown in FIGS. 3 and 4 may be used in lieu of the rabbetted connecting means of FIG. 1.

Figure 5:
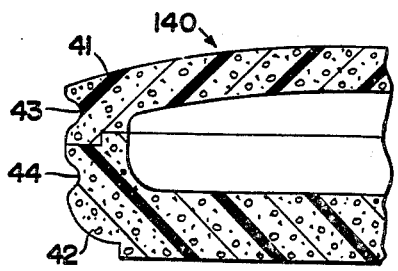
FIG. 5 is a similar section of another modified container.

FIG. 5 shows a container 140 having a top 41 and a bottom 42. In this instance, grooves or recesses 43 and 44 are formed in the top and bottom, respectively, to aid in opening the container when closed. Any suitable sealing beads or means as shown in the other figures of the drawing may be used in the container.

A groove 40a, FIG. 3, is formed below the flanges 40 to aid in grasping the container to open it. A similar groove, indicated at 40b may be formed in the top 31.

These containers of the invention can be inexpensively made in large quantities by suitable molding operations in a conventionael manner and they will provide relatively sturdy, dependable, insulating containers for receiving, and transporting hot articles, such as food dishes including pizzas therein. The wide, shallow constructions of the invention can be reenforced by any suitable type of base ribs or other means provided on the weight carrying portions of the containers or devices whereby the containers or devices will not break readily in service and can provide a reusable container that can be washed readily and maintained in operative condition for a number of transport and storage uses, as desired. Thus, it is believed that the objects of the invention have been achieved.

While several complete embodiments of the invention have been disclosed herein, it will be appreciated that modification of these particular embodiments of the invention may be resorted to without departing from the scope of the invention.

What is claimed is:

1. A heat insulating food storage and transport device comprising
   a relatively wide shallow base,
   a relatively wide shallow top,
   both side base and said top being made from a light plastic material and having interlocking edge portions formed thereon,
   said interlocking edge portions comprise an enlarged edge bead and a recessed bead seat formed in each of the edge portions of said base and top, said edge beads and bead seats being of complementary shapes, and where a radially inner portion of said edge bead on said top has a flat surface thereon to facilitate sliding over said edge bead on said base.

References Cited

UNITED STATES PATENTS

| 2,789,607 | 4/1957 | Tupper | 150—0.5 |
| 3,108,710 | 10/1963 | Lange | 220—72 X |
| 3,335,846 | 8/1967 | Mills | 206—56 X |
| 3,383,009 | 5/1968 | Weikert | 220—60 X |

GEORGE E. LOWRANCE, Primary Examiner

U.S. Cl. X.R.

206—4; 220—44, 60